United States Patent [19]

Van Orden et al.

[11] 4,199,889
[45] Apr. 29, 1980

[54] FISHING FLOAT

[76] Inventors: Lawrence Van Orden, Berkshire Valley Rd., Milton, Oak Ridge; David G. Wilson, Moosepac La., Oak Ridge, both of N.J. 07438

[21] Appl. No.: 911,781

[22] Filed: Jun. 2, 1978

[51] Int. Cl.² .............................................. A01K 93/00
[52] U.S. Cl. .................... 43/43.11; 43/44.88
[58] Field of Search ............... 43/43.11, 44.87, 44.88

[56] References Cited

U.S. PATENT DOCUMENTS

| | | | |
|---|---|---|---|
| 1,918,507 | 7/1933 | Westling | 43/43.11 |
| 2,911,754 | 11/1959 | Mills | 43/43.11 |
| 3,159,941 | 12/1964 | Seymour | 43/44.88 X |
| 3,214,858 | 11/1965 | Louie | 43/44.88 X |

FOREIGN PATENT DOCUMENTS

| | | | |
|---|---|---|---|
| 94478 | 6/1959 | Norway | 43/43.11 |
| 11318 | of 1911 | United Kingdom | 43/44.87 |

*Primary Examiner*—Nicholas P. Godici
*Attorney, Agent, or Firm*—Roy C. Hopgood; John M. Calimafde; Charles W. Neill

[57] ABSTRACT

The float of this disclosure is used with a fishing line to support the bait at any desired depth below the surface of the water. When the fisherman swings his rod to cast the bait and float, they are close together for casting, but the float is constructed to permit the bait to move downward to a predetermined depth after the float strikes the water. When a fish is caught, the bait and fish are brought close to the float during the first part of the reeling-in of the line, so that the fish can be netted, if desired.

10 Claims, 9 Drawing Figures

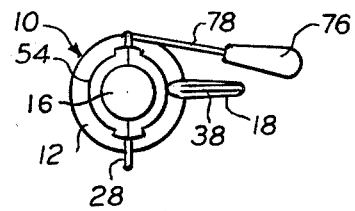
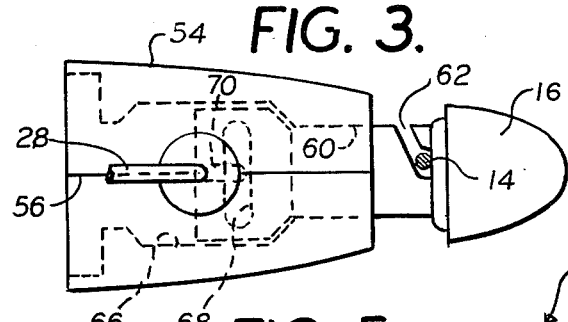
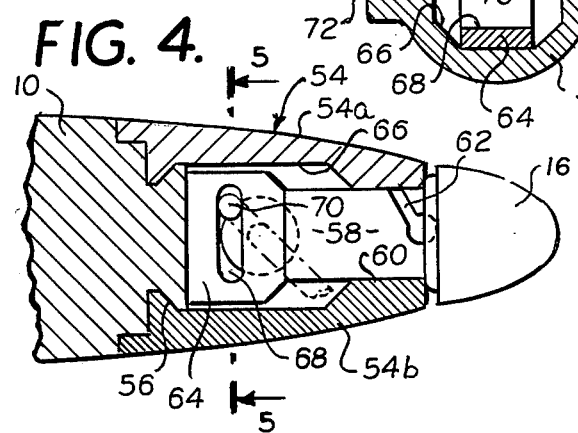
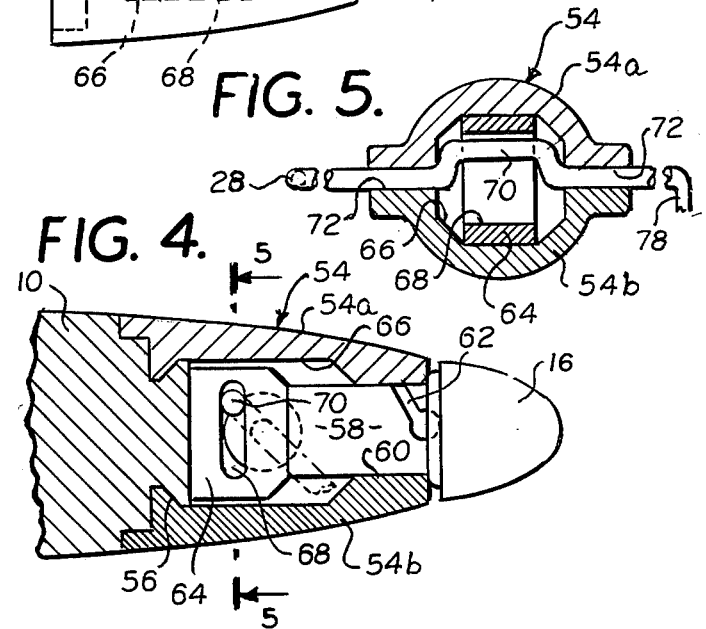
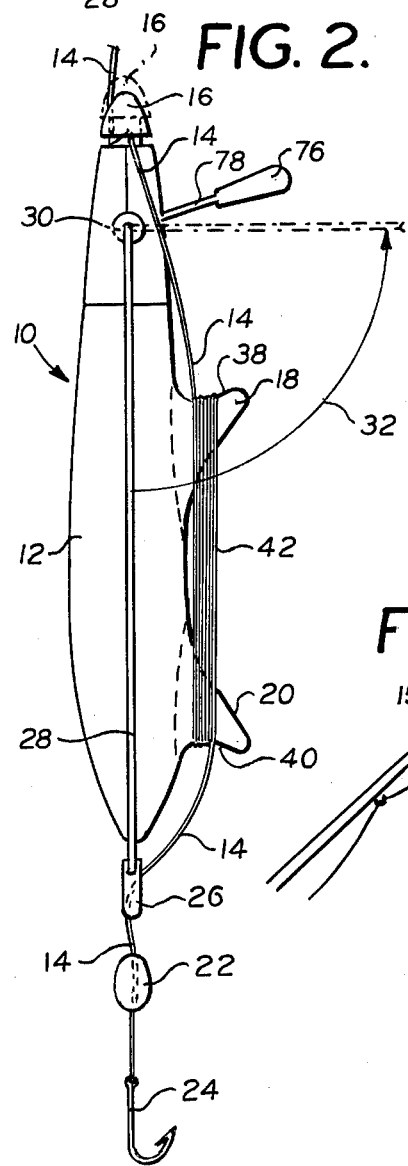
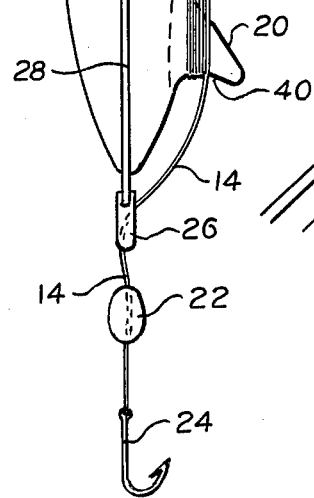
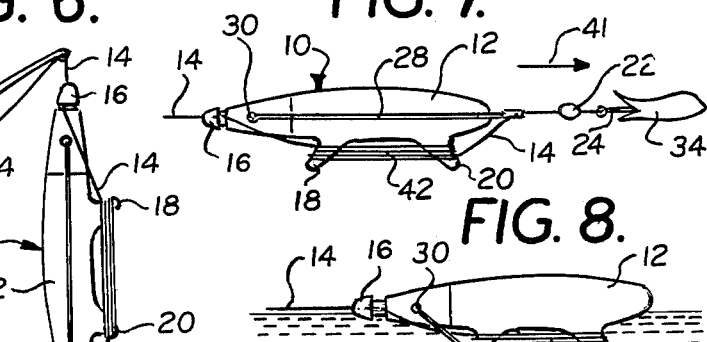
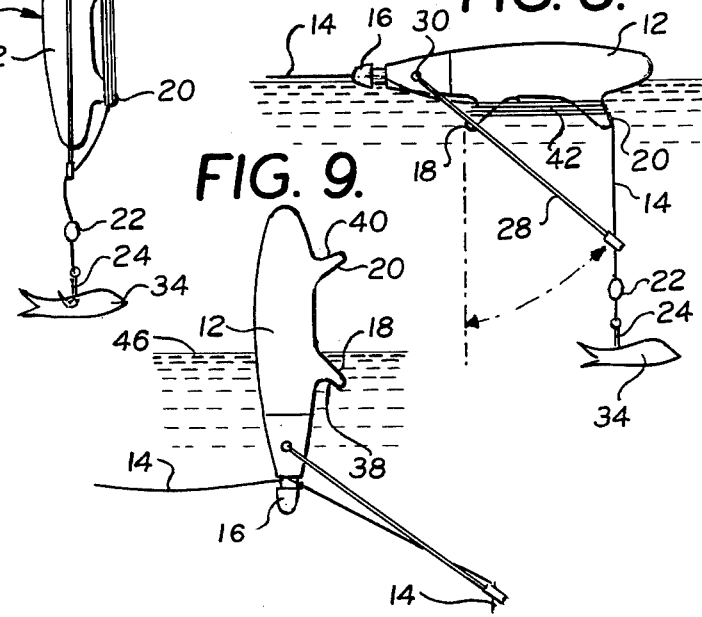
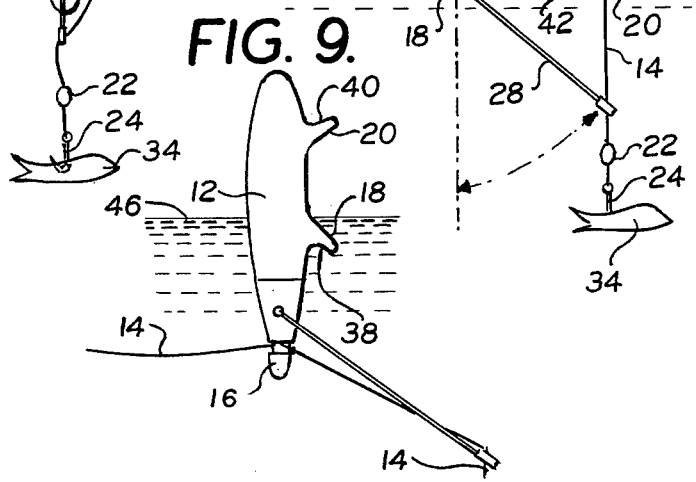

FISHING FLOAT

BACKGROUND AND SUMMARY OF THE INVENTION

In many situations, when fishing from the shore with a rod and line, it is desirable to have the bait suspended below a float at a given distance, depending upon the kind of fish to be caught. It is difficult or impossible, with conventional fishing equipment, to cast a float, sinker and bait with a rod unless the sinker, bait and float are close together when casting. Thus the amount of line between the float and the bait is quite limited, and the bait will not be very far below the float when they are in the water.

This invention provides a float which can have any selected amount of the line wrapped around surfaces of the float before casting; and the float structure is such that this wrapped line will remain wrapped while the float, sinker and bait are cast. When the float strikes the water, there is mechanism which causes the slack line on the float to feed out until it is all unwrapped.

When a fish is caught, the fisherman reels in the line, and the invention is constructed so that the first part of the reeling-in draws the sinker, bait and fish upward to the float; and further reeling-in moves the assembly toward the fishing rod. This is advantageous, because it makes it possible to bring the fish to the surface or near the surface first and to net the fish, if that is desired.

The principal advantages of the invention is that it is simple in construction; easy to use without prior practice; made with a minimum of movable parts and consistently reliable in operation. Other objects, features and advantages of the invention will be pointed out as the description proceeds.

BRIEF DESCRIPTION OF DRAWING

In the drawing, forming a part hereof, in which like reference characters indicate corresponding parts in all the views:

FIG. 1 is a top plan view of the float when in upright position;

FIG. 2 is a side view of the float shown in FIG. 1 with the sinker and hook at the end of the line hanging from the upper part of the float and with a selected amount of excess line wrapped around surfaces of the float for paying out automatically after the assembly has been cast and is in the water;

FIG. 3 is a greatly enlarged view of the upper end of the float with the line-holder in a forward position for receiving the fishing line;

FIG. 4 is a sectional view through the apparatus shown in FIG. 3 but with the line-holder in retracted position;

FIG. 5 is a sectional view taken on line 5—5 of FIG. 4;

FIG. 6 is a diagrammatic view showing the float, sinker, hook and bait hanging from the end of a fishing rod and in position for casting;

FIG. 7 shows the assembly of FIG. 6 moving through the air during casting;

FIG. 8 shows the float on the surface of the water and with the sinker and bait hanging from the float and the slack line which is wound on the float in the process of unwinding to lower the sinker and bait to a desired level below the surface; and FIG. 9 shows the position of the float and line after the line has unwrapped from the float and the sinker and bait have reached the desired level below the surface.

DESCRIPTION OF PREFERRED EMBODIMENT

A fishing equipment 10 which includes a float 12 is connected with a fishing line 14.

FIG. 2 shows the fishing equipment 10 in the position in which it hangs prior to casting. In FIG. 6, the line 14 is shown connected with a rod 15 which is of conventional construction and which includes a conventional reel (not shown). There is a plunger 16 at one end of the float 12, which will be described in connection with the other figures. For the present it is sufficient to understand that the plunger 16 is movable into a position where it secures the float at a given location on the line 14 and into another position where the line 14 can pass freely through an opening in the plunger 16.

Before connecting the float 12 with the line 14 in the position shown in FIGS. 2 and 6, the line 14 is pulled through the plunger 16 to accumulate a slack line equal to the depth below the surface of the water at which the fisherman wants to locate the bait.

The line 14 is then secured to the float at the plunger 16 and the slack is moved downward past projections 18 and 20 which extend from one side of the float 12. The line 14 is first wrapped around the projection 20 and then upward and around the projection 18; then downward around the projection 20 and upward to the projection 18 again. In this manner, the slack is wound up until the line 14 with a sinker 22 and hook 24 are adjacent the lower end of the float, as shown in FIGS. 2 and 6.

The line 14 passes through a ring 26 which may be constructed in the manner similar to a key ring so that the line 24 can be inserted through the ring without having an end of the line available. The ring 26 is secured to one end of an arm 28 which swings about a pivot axis 30; and the arm 28 is movable about the pivot axis 30 through an angle indicated by the arrow 32. A bait 34 is shown on the hook 24 in FIG. 6.

The projections 18 and 20 have surfaces 38 and 40 facing in opposite directions and diverging from one another in a direction toward the right, as shown in FIG. 2. The projections 18 and 20 are rigid portions of the float 12, and the purpose of the divergence of the surfaces 38 and 40 is to prevent the loops of line 14 from sliding off the surfaces 38 and 40 when the equipment 10 is being cast. The angle of divergence of the surfaces from one another is preferably about 10 to 30 angular degrees.

FIG. 7 shows the position of the float 12 during casting. The fishing rod is to the left of the equipment 10 in FIG. 7, and the equipment is travelling through the air in the direction indicated by the arrow 41. While the projections 18 and 20 may not always be in the lowermost position, as shown in FIG. 7, this is the most unfavorable position that they can be in with respect to the loops 42 which are wrapped around the projections 18 and 20. Since the line 14 is wrapped around the projections 18 and 20 with some tension, the diverging surfaces of these projections prevent the loops 40 from falling off the float 12 during the cast.

FIG. 8 shows the float 12 after it hits the water 44. The sinker 22 pulls the float 12 into the position shown in FIG. 8, and the line 14 pulls the arm 28 downward about its pivot 30. This movement of the arm 28 moves a plunger 16 (FIG. 2) from the solid line position shown where it secures the line 14 against movement relative to the float, to a dotted line position in which it leaves the line free to move with respect to the float, as will be explained in connection with FIGS. 3–5. This releases the tension on the loops 42 so that the line 14 pulls the first loop 42 from the projection 18 in a downward direction, which will be evident from FIG. 8. The lowermost loop 42, upon release, permits the sinker 22 to move downward, and the line 14 straightens out so that the sinker 22 is under the projection 20.

As the line 14 unwinds from the projection 20, the sinker 22 pulls the slack downward and moves under the projection 18 with resulting rocking of the control guide arm 28 back into the position shown in FIG. 8. This unwinding operation continues until all of the slack in the loops 42 is free of the projections 18 and 20.

The weight of the sinker is no longer supported from the projections 18 and 20, as it was in FIG. 8, and further downward pull on the line 18 swings the control guide arm 28 into the position shown in FIG. 9. This movement of the control guide arm 28 shifts the plunger 16 into position to grip the line 14 so that it can no longer move through the float 12, and the weight of the sinker thus turns the float 12 into an upright position, as shown in FIG. 9; and the float remains in this position with the sinker, hook and bait at the selected position below the surface until the fisherman reels in the line 14.

Pull on the line 14 toward the left in FIG. 9 tips the float 12 into a generally horizontal position, and this moves the control guide arm 28 in a direction to shift the plunger 16, so that the line 14 is free to move with respect to the float 12. The line 14 pulls through the float 12 and raises the sinker and hook and any fish that may be on the hook.

Thus the sinker, hook, bait and fish, if any, are pulled up toward the float 12 and to a location near the surface of the water where the fish can be netted, if desired.

FIGS. 3–5 show the way in which the plunger 16 operates to clamp the line so that it cannot move with respect to the float during casting; but releases the line when the float is in the water and the equipment is ready for reeling in the sinker and hook from whatever depth they are being supported by the float. There is a plunger support 54 made in two parts which separate along the line 56. Where these parts are shown in section in FIG. 4, the upper part of the housing 54 is indicated by the reference character 54a, and the lower part is indicated by the reference character 54b. These parts are shaped internally so that they fit into a groove 56 in a projecting portion of the float 10, and they are preferably secured together by adhesive, or otherwise, so that the groove 56 holds the housing 54 against any movement with respect to the rest of the float 10.

The plunger 16 has a stem 58, which slides in a bearing 60, provided by an opening in the end of the housing 54. There is a slot 62 in the stem 58, and the line 14 extends through this slot. In the ordinary operation of the plunger 16, the open end of the slot 62 is opposite the surface of the bearing 60, so that the line 14 cannot become disengaged from the float; but the plunger 16 can be pulled out far enough, as shown in FIG. 3, to permit the line 14 to be inserted and removed from the float when desired. A block 64 securely fastened on the end of the stem 58 slides in a generally square chamber 66, and there is a slot 68 through the slot 64.

A crank 70 extends through the slot 68 and rotates in bearings 72 opposite sides of the housing 54.

The control guide arm 28 is connected with one end of the crank 70, and the movement of the control guide arm 28 operates the crank 70, so as to pull the plunger 16 into the position shown in FIG. 4 when the control guide arm 28 is hanging downward in the position shown in FIG. 2. This causes the plunger 16 to clamp the line against the end faces of the housing 54 so that the line cannot move with respect to the float. When wrapping the loops 42 around the projections 18 and 20, it is not necessary to hold the float in any particular position, because the float can be held in one hand and the thumb used to press the plunger 16 into position to hold the line clamped against the housing 54, the crank 70 moving into whatever position is necessary to permit such a movement of the plunger. Thus the line can be wrapped around the surfaces 38 and 40 of the projections 18 and 20 with these portions of the float in the most convenient position for the wrapping. Experience has shown that the most advantageous angle for the surfaces 38 and 40 to diverge from one another is between 10 and 30 degrees. If the angle is less than 10°, there is danger of the loops all sliding off at once when the sinker moves from the position shown in FIG. 7 to that shown in FIG. 8. If the angle of divergence of the surfaces 38 and 40 from one another is greater than 30°, some of the loops may fail to clear the projections 18 and 20 when the sinker pulls the line 14 down in the way already described in connection with FIG. 8. If any loops remain wrapped around the projections 18 and 20, the bait will not descend to the intended level below the surface of the water.

In order to have the float 12 occupy a position in which the projections 18 and 20 are lowermost, a counter-weight 76 (FIGS. 1 and 2) is attached to an arm 78 which is rigidly secured to the end of the crank 70 (FIG. 5) at the end of the crank which is remote from the arm 28. Thus the counter-weight 76 balances the weight of the control guide arm 28 to maintain the trim of the float when in the water.

The preferred embodiment of the invention has been illustrated and described, but changes and modifications can be made and some features can be used in different combinations without departing from the invention as defined in the claims.

What is claimed is:

1. Fishing equipment including in combination a float for connection with a line from a reel on a fishing rod, a guide on the float through which the line passes, spaced surfaces extending from the bottom of the float and facing in different directions from one another so that slack in the line beyond the guide can be wrapped in loops from one of said surfaces to the other, areas of the spaced surfaces diverging from one another in a downward direction when the float is floating in the water with the said surfaces horizontally spaced from one another, the angle of divergence being sufficient to cause each loop that is wrapped around the spaced surfaces to remain in place until a next loop below them has unwound from said spaced surfaces and provided slack to the next loop above sufficient to permit said next loop above to slide over the lower ends of the diverging surfaces, characterized by a line guide through which the line passes at a location between the loops that are wrapped on the spaced surfaces and a bait on the fishing line, said line guide being in position to hold the line beyond the loops on the surfaces about which they are wrapped during casting of the bait and float and further characterized by a control guide arm having a substantial length parallel to a longitudinal axis of the float during casting of the float and bait, the control guide arm having a pivotal connection to the float at one end thereof and the line guide being connected to the control guide arm at a location spaced from said pivot connection.

2. The fishing equipment described in claim 1 characterized by a plunger on the float at the end of the float that is closest to the pivot connection of the control guide arm, the plunger having relative movement with respect to the rest of the float and having clamping faces between which the line passes, the plunger clamping the line against movement with respect to the float when at one limit of said relative movement.

3. The fishing equipment described in claim 1 characterized by a plunger on the float at the end of the float that is closest to the pivot connection of the control guide arm, a bearing in the float into which the plunger extends, the plunger having telescoping movement with respect to another part of the float, a space between the plunger and the other part of the float through which the line passes and in which the line is clamped during casting, and means for moving the plunger in a direction to release the clamping of the line when the float hits the water.

4. The fishing equipment described in claim 3 characterized by the control guide arm at its pivot connection to the float being adjacent to the plunger and having means for moving the plunger in a direction to release the clamping of the line by the plunger.

5. The fishing equipment described in claim 4 characterized by the means for moving the plunger in a direction to release the clamping of the line by the plunger being a crankshaft extending through the float, the crank extending through a slot in the plunger, and the crank being associated with the control guide arm so as to move the plunger to release the line when the float is in a longitudinal position on the surface of the water and the control guide arm swings downward about its pivot connection as an axis, such movement being caused by the weight of the line guide at the end of the arm remote from the pivot connection and by other weight, such as a sinker or bait, that is suspended in the water by the line that passes through the line guide.

6. The fishing equipment described in claim 5 characterized by the control guide arm extending along one side of the float during casting, and being of sufficient length to carry the line guide to a depth below the loops that are wrapped around the diverging surfaces so that downward pull on the line by a sinker and bait pulls the loops downward successively from said diverging surfaces until all of the loops are removed and the bait is at the preselected depth below the float, the weight of the line guide, sinker and bait being heavy enough to pull the plunger end of the float lowermost with the normal bottom of the float extending in a generally vertical position.

7. The fishing equipment described in claim 6 characterized by a fishing rod with which the equipment is connected, the plunger that clamps the line being moved out of its clamping position when the float is moved into a generally vertical position by the weight of the line guide, sinker and bait, and the fishing rod comprising means for reeling in the line that passes through the line guide and plunger while the float remains in its generally vertical position in the water whereby a fish caught by the bait can be brought up to a depth close to the float for netting.

8. Fishing equipment including in combination a fishing pole for reeling in a line, a float, a line retainer for connecting the float with a line from said pole, guide means connected with the float and through which the line connects with a bait and sinker located close to the float for casting, means for holding an extra and preselected length of line between the line retainer and the guide means while casting, means for feeding out the extra length of line when the float is cast and settles in the water so that the bait is at a pre-selected depth below the float, the extra length of line being free of said means for holding said line when reeling in the line so that the extra line is reeled in past the float and the bait and any fish thereon is raised close to the level of the float for netting the fish, characterized by means holding the line retainer in position to clamp the float to the line during casting, and apparatus carried by the float and operable after the float has settled in the water for releasing the line retainer from its clamping position, and further characterized by the line retainer being a plunger that moves toward and from a forward part of the float, a housing on the forward part of the float into which a stem of the plunger extends, said housing being made in two sections which are secured together and which contain non-circular cross-section bearings in which the plunger slides but is held against rotation, the plunger having a portion that fits the cross-section of the bearing and that slides thereon between the clamping and unclamping positions.

9. The fishing equipment described in claim 8 characterized by a crankshaft extending through the housing with a crank extending into the plunger for moving the plunger in said bearing between clamping and unclamping positions, an arm connected with one end of the crankshaft, said arm being movable angularly about the axis of the crankshaft and extending along one side of the float in one position and downward into the water below the level of the float in another position to change the position of the plunger.

10. The fishing equipment described in claim 9 characterized by the crankshaft extending through both sides of the housing for connection with said arm at one side and for connection with a second arm at the other side, the second arm having a counterweight thereon for counterbalancing the weight of the first arm to control the trim of the float when in the water.

* * * * *